United States Patent [19]

Reinartz et al.

[11] Patent Number: 4,861,117
[45] Date of Patent: Aug. 29, 1989

[54] BRAKE PRESSURE REGULATOR

[75] Inventors: Hans-Dieter Reinartz, Frankfurt am Main; Helmut Steffes, Hattersheim, both of Fed. Rep. of Germany

[73] Assignee: Alfred Teves GmbH, Frankfurt am Main, Fed. Rep. of Germany

[21] Appl. No.: 264,475

[22] Filed: Oct. 28, 1988

[30] Foreign Application Priority Data

Nov. 5, 1987 [DE] Fed. Rep. of Germany ....... 3737466

[51] Int. Cl.$^4$ ................................................ B60T 8/64
[52] U.S. Cl. ..................................... 303/100; 303/114
[58] Field of Search ................ 180/197; 303/100, 103, 303/106, 110, 114, 116, 119

[56] References Cited

U.S. PATENT DOCUMENTS

| 4,589,706 | 5/1986 | Leiber | 303/114 |
| 4,660,897 | 4/1987 | Leiber | 303/114 |
| 4,662,687 | 5/1987 | Leiber | 303/114 X |
| 4,775,008 | 7/1988 | Imoto et al. | 303/100 X |

Primary Examiner—Duane A. Reger
Attorney, Agent, or Firm—Robert P. Seitter

[57] ABSTRACT

The invention discloses a brake pressure regulator for anti-locking control and for traction skid control of automotive vehicles. The regulator comprises a master cylinder, a hydraulic brake force booster, an electronic controller which, based on sensor signals, at the output thereof, renders available variable signals according to a control algorithm to switch electromagnetic valves associated with the wheel cylinders, a pressure fluid source and a reservoir. A valve aggregate insures the adaptation of the pressure level from the pressure fluid source to the operating pressure desired for the TSC-mode and the ALC-mode. Moreover, the valve aggregate, with the brake applied, turns off the TSC-mode. The valve aggregate comprises at least one plunger/ball arrangement serving a the closing and/or control member. The advantages involved with this brake pressure regulator reside in the automatic pressure level regulation and the automatic turn-off of the TSC-mode. Moreover, the inlet and blocking valves otherwise required for the TSC-mode are eliminated. Advantageous use is made of ball/seat valves in the present invention.

18 Claims, 8 Drawing Sheets

BRAKE PRESSURE REGULATOR

BACKGROUND OF THE INVENTION

The present invention is concerned with a brake pressure regulator for a hydraulic brake system for automotive vehicles to perform anti-locking control (ALC-mode) and traction skid control (TSC-mode), comprising a master cylinder, a pressure modulation aggregate for changing the hydraulic pressure in the wheel cylinders (wheel cylinder pressure modulator), an electronic regulator and wheel sensors generating sensor signals received by the electronic regulator at the input thereof, processing the same in accordance with one or more control algorithms, and rendering the same available at the output thereof as corrective variables for the wheel cylinder pressure modulator, and further comprising a pressure fluid source generating a hydraulic source pressure, a pressure fluid reservoir, a hydraulic brake force booster which, upon actuation of the brake pedal, generates a controlled hydraulic pressure (booster pressure).

In modern automobile engineering, the use of automatically controlled brakes is increasing to provide for enhancing the driving stability. Anti-locking devices are already being assembled in large numbers. Added thereto is the traction control of the automotive vehicle, i.e., the control of the pressure in the wheel cylinders of actuated or driven wheels during start-off or during acceleration. Racing or loss of traction of the driven wheels is to be precluded and the driving stability to be increased thereby. This will especially apply in the event of low coefficients of traction of the road surface and abrupt changes in the coefficient of friction or split.

Two general practices exist for controlling the traction skid:

First, traction control with no gearing, i.e. in the absence of so-called "engine management". In this method of control, only the brake or, stated more precisely, the modulated pressure in the wheel cylinders of the brake, is used for traction control. This process is referred to as the "Brake Blocking Differential" or, in abbreviated form, as "BBD".

Secondly, the combination of control through the brake as described above and simultaneous control in the presence of "engine management".

In engine management, the torque of the internal combustion engine is changed by a change in the rate of fuel injection, by a change in the throttle valve position, by switching on and off the whole ignition or individual spark plugs only, by ignition timing adjustment or by other means.

Hence, the traction, on the one hand, is controlled by applying the brake and, on the other hand, by switching off or reducing the engine torque.

The second-method of control, in recent usage, is called "traction skid control" or "TSC", although former usage referred to traction skid control as a control method described under the first method.

All statements made in the claims and in the description hereinafter relative to traction skid control, for reasons of simplification, also apply to brake blocking differential control.

The development in modern automobile engineering, tends to control the torque on the wheel of the automotive vehicle both in the decelerating event (anti-locking control) and in the traction event (BBD-control and traction skid control, respectively).

Efforts are being made on the part of the automotive industry to improve the anti-locking devices by traction skid control means. The combination of anti-locking devices and traction skid control means is generally speaking known in the art.

Reference is made, for example, to German Patent Application P 3611931.

The German Patent Application P 36 11 931 refers to a hydraulic brake system with wheel skid control means, especially for use with automotive vehicles. The system includes a master cylinder pressurizable by a hydraulic force booster, wherein valve means are provided between the master cylinder and the wheel brakes connected to the master cylinder. Pressure fluid is withdrawable from the wheel brakes through the valve means, with pressure fluid withdrawn from the wheel brakes being replenishable from the pressure chamber of the hydraulic force booster or from an auxiliary pressure source, and wherein, during the control process, the stroke of the brake pedal is limited.

The special features of the wheel skid control means reside in pressure conduits connected to the brake conduits leading from the working chambers of the master cylinder to the wheel brakes. The pressure conduits are capable of being connected to the pressure chamber of the hydraulic booster and/or to the auxiliary pressure source through the valve means. Check valves are provided in the brake conduits through which the connections of the brake conduits in the working chambers of the master cylinder can be interrupted.

In traction skid control means of the type described above, substantial efforts in terms of valves are involved. The use of a plurality of magnetic valves is required to insure faultless operation of the system in the traction skid control mode. In this connection it is to be taken into consideration that, in the traction skid control mode, some parts of the anti-locking device are to be hydraulically separated from the traction skid control components. However, conversely, the pressure fluid supply for the traction skid control is to be safeguarded. These requirements make the use of several electromagnetic valves imperative.

German Patent Application 36 38 047 discloses a hydraulic brake system with brake and traction skid control for use with automotive vehicles. The system includes a pedal-operated brake presure operator consisting of a master brake cylinder, a force booster and a pressure source. Valves are connected to the wheel brakes and are controlled by skid control means.

In the afore-described brake system a pressure reducing valve is coupled to the pressure source. The pressure reducing valve is actuated either by the pressure in the booster chamber or, if the pressure in the booster chamber is low, by a predetermined force so that the pressure of the booster chamber or a pressure corresponding to the predetermined force prevails in the outlet chamber of the pressure reducing valve.

SUMMARY OF THE INVENTION

It is desireable in the present invention to improve the combined anti-locking control system and traction skid control system (ALC and TSC-system). It is also desireable to decrease the manufacturing costs of the combined system, to simplify the construction of the systems, and to enhance the operating safety thereof.

Moreover, the number of valves required to operate the system is to be reduced. In addition, the electronic efforts involved with such valves are to be eliminated.

In the TSC-mode, an automatic regulation of the pressure level of the pressure fluid source to the pressure level suitable for the TSC-mode is to be effected.

In applying the brake, the TSC-mode is to be switched off automatically. After the transfer from the TSC-mode to the ALC-mode, another automatic control is to insure adjustment of the pressure level suitable for the ALC-mode.

These automatic processes are to be performed by simple and safe operating means.

Another problem basic to the invention resides in using the controlled booster pressure of the brake force booster for automatically switching off the TSC-mode, in particular, with low structural efforts.

A structural configuration is to be provided that permits broader variability in considering the requirements of customers. In addition, the design is to be simpler and should be realizable by standardized units. The number of functions is to be increased.

Provision is made for enabling ball-seat valves to be employed, thereby achieving reduced manufacturing costs, as the use of standardized components is permitted. In addition, ball-seat valves enable sealing problems to be solved more easily. Also, ball-seat valves are to be used for control purposes. As ball-seat type valves are flexibly employable it will be readily possible to adapt construction including ball-seat type valves to the requirements of customers.

The present invention includes a valve aggregate for the traction skid control mode (TSC-valve aggregate) disposed in the pressure fluid supply between the pressure fluid source, preferably a pressure fluid accumulator, and the hydraulic booster, on the one hand, and the wheel cylinder pressure modulator, on the other. The TSC-valve aggregate includes a valve member (first member) opening under the effects of the source pressure in the TSC-mode, which first member establishes, in the TSC-mode, a hydraulic connection between the pressure fluid source and the wheel cylinder pressure modulator. A (second) member of the TSC-valve aggregate moves upon termination of the TSC-mode and upon commencement of the brake application under the effect of the booster pressure. The second member, upon actuation of the brake pedal, adjusts the source pressure supplied to the level of the booster pressure to establish a hydraulic connection between the pressure fluid source and the wheel cylinder modulator. The two members of the TSC-valve aggregate include at least one plunger-ball arrangement wherein the ball is formed as a valve closure member which, through the plunger, is disposed in a manner removable from the valve seat thereof.

One embodiment of the invention suggests that the first and second member comprise a common or single plunger-ball arrangement.

The plunger-ball arrangement, in addition to the passing and blocking functions, can also perform the function of a control valve.

In particular, the plunger-ball arrangement can be configured as a control valve adjusting, in the TSC-mode, the source pressure to the TSC-operating pressure.

Moreover, it is suggested that the plunger-ball arrangement, in the ALC-mode, regulates the source pressure in response to the booster pressure to the ALC-operating pressure.

For deliberately influencing the control effect, it is suggested that the first member of the TSC-valve aggregate, be under the load of a spring in the closing direction.

According to another embodiment of the invention it is suggested that the second member is configured as a piston of equal effective cross-section on either side, with pressure being applied by the booster to the first cross-section and with pressure from the pressure fluid source adjusted to the level of the booster pressure being applied to the second cross-section so that the piston is balanced in terms of force.

According to another embodiment of the invention, the first member is furnished with a closure body of spherical configuration which is disposed in a manner removable from its seat by a plunger connected to the second member of piston-type configuration.

The basic principle embodied in the invention resides in the TSC-valve aggregate comprising a hydraulic controller means for adjusting the pressure level of the pressure fluid source (source pressure) to the pressure level (TSC-pressure) required for the TSC-mode. The hydraulic controller comprises a controller piston including closure member and valve seat. A plunger is provided capable of removing the closure member from the valve seat thereof, and the valve seat is connected to the controller piston, that the controller piston is slidingly and sealingly guided in a cylinder, and the controller piston is formed as a differential piston. Source pressure can be applied to the smaller-sized effective cross-section, and controlled source pressure can be applied to the larger effective cross-section. The larger and smaller effective cross-sections are dimensioned at a ratio with respect to one another such that the source pressure is regulated to the desired TSC-operating pressure.

Moreover, a blocking piston may be provided which, upon termination of the TSC-mode, under the action of the booster pressure locks the controller piston.

Moreover, a control piston may be provided to which, when the brake is applied, the booster pressure will be applied to thereby adjust the source pressure to the desired level of the ALC-operating pressure.

The control piston may be provided with a plunger which along with a valve closure member and a valve seat, will adjust the source pressure to the desired level of the ALC-operating pressure.

Moreover, provision may be made such that the blocking piston and the control piston are disposed in coaxial relationship with respect to one another and that the blocking piston, in the interior thereof, is provided with a cylindrical guide for the control piston.

This form of embodiment may be broadened in that the control piston is sealed against the blocking piston by a sealing sleeve exhibiting a check-valve function, with a pressure fluid passage from the booster pressure inlet to the outlet for the wheel cylinder modulator being permitted and a pressure fluid passage in the opposite direction not being permitted.

Moreover, it is suggested, that the traction skid control valve aggregate comprise a regulator portion and a switch portion, that the regulator portion include a regulator piston furnished with a—preferably central—axial bore and a seat valve capable of being opened by a plunger, that the regulator piston be configured as a differential piston, wherein source pressure is applied to the first smaller-sized effective cross-section and controlled source pressure and traction skid control operating pressure is applied to the larger-sized effective cross-section, that a connecting line be provided between the regulator portion and the switch portion which, through a connecting or blocking valve in the TSC-mode can be released and, upon applying the brake, can be closed, that the switch portion comprise a switch piston including a switch piston plunger which are both provided with internal passageways establishing a connection, in the TSC-mode, between the regulator portion and the outlet to the wheel cylinder modulator, that the switch piston be formed and disposed in a manner that booster pressure can be applied thereto, and upon applying of booster pressure, closes the connecting and blocking valve, respectively, through the switch piston plunger, that the switch piston, through a sealing sleeve, be sealingly guided in the cylindrical guide thereof, with the sealing sleeve being configured in a manner that it performs a check valve function, thereby causing pressure fluid, at booster level, through overflow of the sleeve, to arrive at the outlet for the wheel cylinder modulator.

In yet another embodiment of the invention, the brake pressure regulator is of a configuration such that the TSC-valve aggregate comprises a regulator portion and a switch portion, that the regulator portion includes a regulator piston provided with a—preferably central—axial port and a seat valve capable of being opened by a plunger, that the regulator piston is of a differential-piston-configuration wherein source pressure can be applied to the first smaller sized effective cross-section and controlled source pressure and TSC-operating pressure can be applied to the second larger-sized effective cross-section, respectively, that a connection for booster pressure is provided which, through conduits, is in communication with one annular pressure chamber in the regulator portion and two pressure chambers in the switch portion, that a connecting line is provided between the regulator portion and the switch portion, carrying controlled source pressure and TSC-operating pressure, respectively, with the connecting line being closeable through a connecting or blocking valve located in the switch portion, that the regulator piston comprises a third effective cross-section to which booster pressure can be applied when actuating the brake thereby causing the regulator piston to move and, along with the plunger, to open such that full source pressure is fed into the connecting line, that the switch portion includes a switch piston to which, with the brake applied, booster pressure can be applied in the first pressure chamber, causing the connecting and blocking valve, respectively, first to close, that the switch portion comprises a floating piston having two equal-sized effective cross-sections to which, when applying the brake, on the one hand, booster pressure is applied in the second chamber of the switch portion and, on the other hand, controlled source pressure is applied in the chamber, and which, along with a plunger, cooperates, in pressure-controlling manner, with the connecting and blocking valve, respectively, providing, at the outlet, a controlled source pressure corresponding to the booster pressure.

To provide the controlled booster pressure in the anti-locking control mode, it is suggested in another embodiment of the invention, that, in the area of the floating piston, a unit of check valve function be provided.

In a preferred form of the invention, the brake pressure regulator is provided with an electromagnetically switchable hydraulic valve (master valve) which is located in the pressure fluid guide between the TSC-valve aggregate and the wheel cylinder pressure modulator, with the wheel cylinder pressure modulator comprising electromagnetically actuated passage and blocking valves of which respectively one passage valve and one blocking valve is associated with a wheel cylinder. In a brake pressure regulator of the aforementioned type it is suggested that a pressure-sensitive switch (pressure switch) be provided, which is so configured and disposed that in the presence of pressure in the area of the pressure fluid supply located between the master valve and the wheel cylinder, it generates a signal (pressure switch signal) fed to the electronic regulator, that the electronic regulator, in the presence of the pressure switch signal and upon detection that the master valve was not actuated, at the output thereof, generates control signals for switching the passage valves associated with the wheel cylinders, thereby causing the passage valves to be opened and the pressure fluid source, preferably the pressure fluid accumulator, to be emptied.

The present invention overcomes the disadvantages involved previous systems. The problems encountered especially with a view to saving magnetic valves, and with a view to automatic control of the pressure level and automatic switch-off of the TSC-mode with the brake applied, have been solved. The advantages involved with a plunger/ball seat valve arrangement have been realized.

By reducing the number of electromagnetic valves, the corresponding output stages in the electronic regulator are saved. Additionally, in the area of the TSC-aggregate, the pressure switch is eliminated. In connection therewith, the corresponding input is saved in the electronic regulator. The entire cable harness can be of a simpler configuration. Valve block connectors and counter-connectors are saved.

BRIEF DESCRIPTION OF THE DRAWINGS

Further details of the invention will become apparent from the following detailed description of the invention, when read in conjunction with the attached drawings, in which.

DESCRIPTION OF THE PREFERRED EMBODIMENTS

Figure 1:
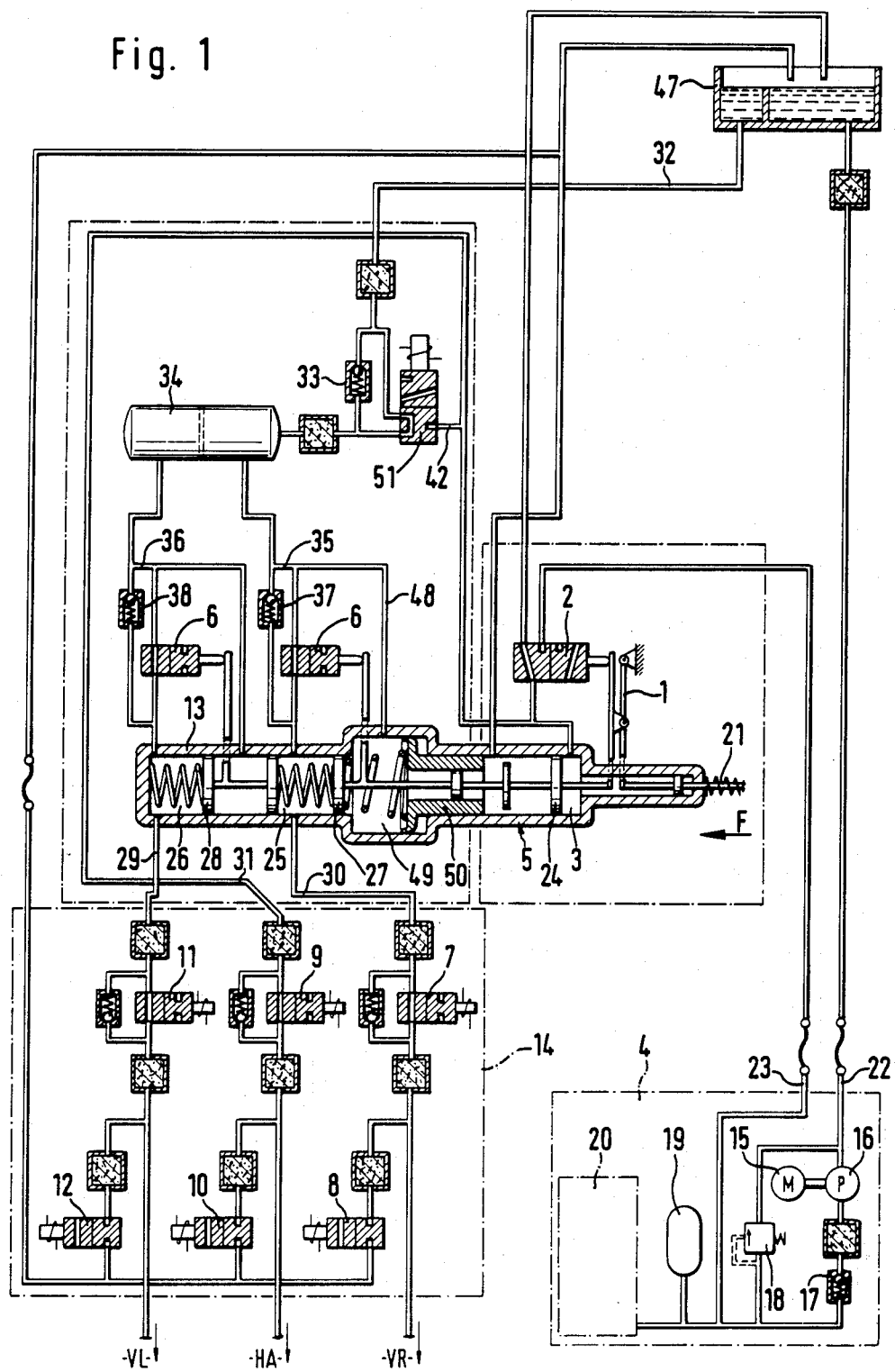
FIG. 1 shows a brake pressure regulator for carrying out anti-locking control.

The anti-locking device as shown in FIG. 1 substantially comprises the following aggregates: a pressure fluid supply system 4; a booster 5; a master cylinder 13; an anti-locking pressure modulation aggregate (ALC-aggregate) 14; and a reservoir 47. The pressure fluid supply system comprises a motor 15 actuating a pump 16, a safety valve 18 and an accumulator 19. The reference numeral 20 refers to the monitoring unit for the pressure fluid supply.

The pump, through the conduit 22, withdraws pressure fluid from the reservoir 47. Through the pump 16 the pressure fluid is fed, via the check valve 17, into the accumulator 19 and into the pressure conduit 23. The booster 5 and the tandem master cylinder 13 are disposed in coaxial relationship. The booster pressure in the booster pressure chamber 3 is controlled through the control valve 2 in response to the pedal force F and is referred to as the controlled booster pressure.

The ALC-aggregate 14 for the control of the pressure in the wheel cylinders comprises a plurality of inlet valves in the form of electromagnetic valves open in the de-energized condition or SO-valves 7, 9, 11. The ALC-aggregate also contains electromagnetically actuated outlet valves which are closed in the de-energized condition or SG-valves 8, 10, 12.

VL refers to the pressure fluid outlet for the wheel cylinder on the front axle, left-hand side. Reference character HA refers to the pressure fluid supply to the rear axle. Reference character VR refers to the pressure conduit leading to the wheel cylinder on the right-hand wheel of the front axle. The wheels of the front axle, hence, are individually anti-locking controlled whereas both wheels of the rear axle are commonly anti-locking controlled.

The SO-valves and SG-valves of the ALC-aggregate are controlled by the output signals of an electronic regulator. The electronic regulator serves to process the wheel sensor signals in accordance with an anti-locking control algorithm and in accordance with a traction skid control algorithm, respectively, once the device, as described hereinafter, is extended to a traction skid control means.

The principle of detecting the wheel peripheral speed by sensors, processing of the sensor signals in an electronic regulator and the actuation of the SO-valves and SG-valves through the output signals of the regulator are generally speaking known in the art. By way of example, reference is made to DE-OS 3610352.

The operation of the brake system in the normal brake mode will now be described. Through the pedal force F, the pushrod 21 is displaced to the left. The control valve 2 is actuated by the dual lever mechanism 1. Control valve 2 will open and, in response to the pedal force, pressure will be built up in the booster pressure chamber 3. Pressure fluid can now pass from the accumulator 19, through the pressure conduit 23, into the booster pressure chamber 3.

This will displace the booster piston 24 to the left. The booster piston moves the pushrod piston 27 and the intermediate piston 28 of the tandem master cylinder. Pressure will build up in the working chambers 25, 26 of the tandem master cylinder to be passed, through pressure conduits 29, 30 and the opened SO-valves 11, 7 to the left-hand brake on the front wheel axle and to the right-hand brake on the front wheel axle. The hydraulic pressure for the rear axle, through the pressure conduit 31, is directly withdrawn from the booster pressure chamber.

Valves 6 are known per se central valves which upon actuation of the master cylinder, i.e., in the event of a pressure build-up in the working chambers, will close. When releasing the brake, the central valves 6 will switch to the passage position to enable pressure fluid from the reservoir 47, through conduit 32, the check valve 33 and the plenum chamber 34, to be fed. For details concerning the construction and operation of the central valves, reference is made to the afore-mentioned German Patent Application No. P 36 38 047.

FIG. 1 shows the device in the brake releasing position. The anti-locking control will now be described. Through an output signal of the electronic regulator, the master valve 51 is switched to the passage position. At the same time, the conduit 32 leading to the supply reservoir 47, is blocked through the master valve 51. Through the hydraulic conduit 48, the chamber 49 is pressurized. The positioning sleeve 50 is displaced to the right and, during the skid control process, locks the components alone responsible for the normal brake mode.

Through the pressure build-up in the chamber 3, the booster piston 24 is displaced to the left down to the stop, thereby equally displacing the pistons 27 and 28, through a predetermined distance, to the left. The central valves 6 are closed. Pressure fluid is passed from the booster pressure chamber 3, through the conduit 42, the master valve 51, the plenum chamber 34, the pressure conduits 35, 36, the check valves 37, 38 into the working chambers 25, 26 from where pressure fluid will be passed to the brakes of the front axle. In practice, the check valves constitute sleeves of pistons 27, 28. Based on the type of construction of the sleeves, they fulfill the desired check valve function. In accordance with the anti-locking control algorithm installed in the electronic regulator, the SO-valves and the SG-valves 7, 8, 11, 12 are switched. Pressure in the wheel cylinders of the front axle, in accordance with the control algorithm is reduced, kept constant or rebuilt. Similarly, the pressure in the wheel cylinders of the rear axle, in accordance with the anti-locking control mode is controlled through the SO-valves and SG-valves 9, 10. The pressure supply for the rear axle is effected directly from the booster pressure chamber 3, through the pressure conduit 31.

Figure 2:
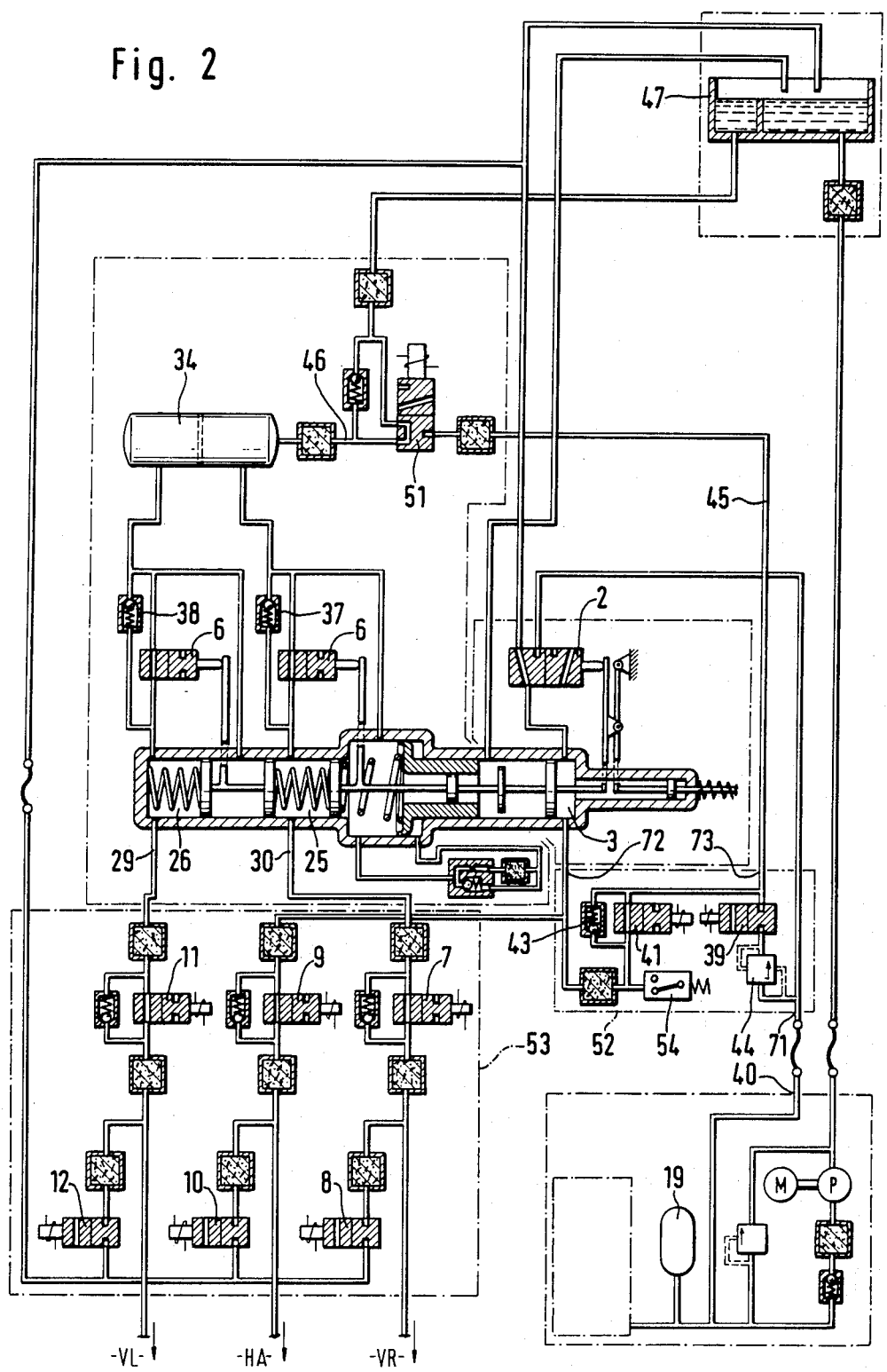
FIG. 2 shows a device according to FIG. 1, supplemented by traction skid control means.

FIG. 2 shows the combination of an anti-locking regulator according to FIG. 1 with a traction skid regulator for the wheel brakes of the front axle. For the sake of a better illustration of the traction skid control mode and a better description of the traction skid aggregate, in FIG. 2, only the components required therefore are provided with reference characters. The reference characters for the rest of the components are conveyed by FIG. 1. The method used in anti-locking control analogously, is employed in traction skid control. Wheel sensor signals are supplied to an electronic regulator. The signals are processed in the electronic regulator according to control algorithms installed therein. The electronic regulator, at the output thereof, generates output signals. The output signals form the switch signals for the SO-valves and SG-valves of the traction skid regulator. The SO-valves and SG-valves will always be switched as is prescribed by the control algorithms in the traction skid control mode and in the anti-locking control mode.

As opposed to the embodiment according to FIG. 1, wherein the ALC-operating pressure comes from the booster chamber 3, in the circuit according to FIG. 2, the pressure for the wheel cylinders of the front axle in the ALC-mode and TSC-mode is derived from accumulator 19. The traction skid control according to FIG. 2 will now be described. Based on the wheel sensor signals, which are processed according to a traction skid control algorithm in the electronic regulator, the electronic regulator detects that a pressure build-up will have to take place in the wheel cylinders of the actuated wheels of the front axle. In that situation, the following valves will take the positions described below.

The inlet valve 39 is switched into the passage position, and valve 41 is switched into the blocking position. The master valve 51 is opened. The SO-valves 7, 11 are in their opened resting position. The SG-valves 8, 12 are in their closed resting position.

Pressure fluid from the accumulator 19, passes through the conduit 40, while the control valve 44 effects an adaptation, i.e., a reduction, for example, at the ratio 2:1, of the accumulator pressure to the TSC-operating pressure. The inlet valve 39, the conduit 45, the master valve 51 switched to the passage position, the conduit 46, the plenum chamber 34, the sealing sleeves with check valve effect 37, 38 and the central valves 6, respectively, the working chambers 25, 26 of the tandem master cylinder, the conduits 29, 30, the SO-valves 7, 11 in the resting, i.e., open position, can now pass pressure fluid to the wheel cylinders of the front axle.

As shown in FIG. 2, the TSC-aggregate performs the function of the inlet valve, the function of the blocking valve, the function of the control valve and the function of the pressure switch 54. The function of the pressure switch 54 resides in safely switching off the TSC-mode. If, for example, in the TSC-mode, the brake pedal is abruptly actuated, an excessively high pressure can develop in the master cylinder to propagate to the wheel cylinders. This would result in an undesirably sudden braking. The pressure switch, for that purpose, through a signal conduit, provides an input signal to the electronic regulator of the ALC/TSC systems. The electronic regulator through a corrective signal at the output thereof, switches the input valve, SG-valve 39, into its resting position, i.e., its closed position, and the blocking valve 41, is switched into its resting position, i.e., its opened position, so that no accumulator pressure can be passed through the TSC-aggregate into the hydraulic actuating system.

It is part of the afore-described objects of the invention to carry out the functions of the TSC-aggregate as described with reference to FIG. 2, supplemented only by one valve arrangement.

Figure 3:
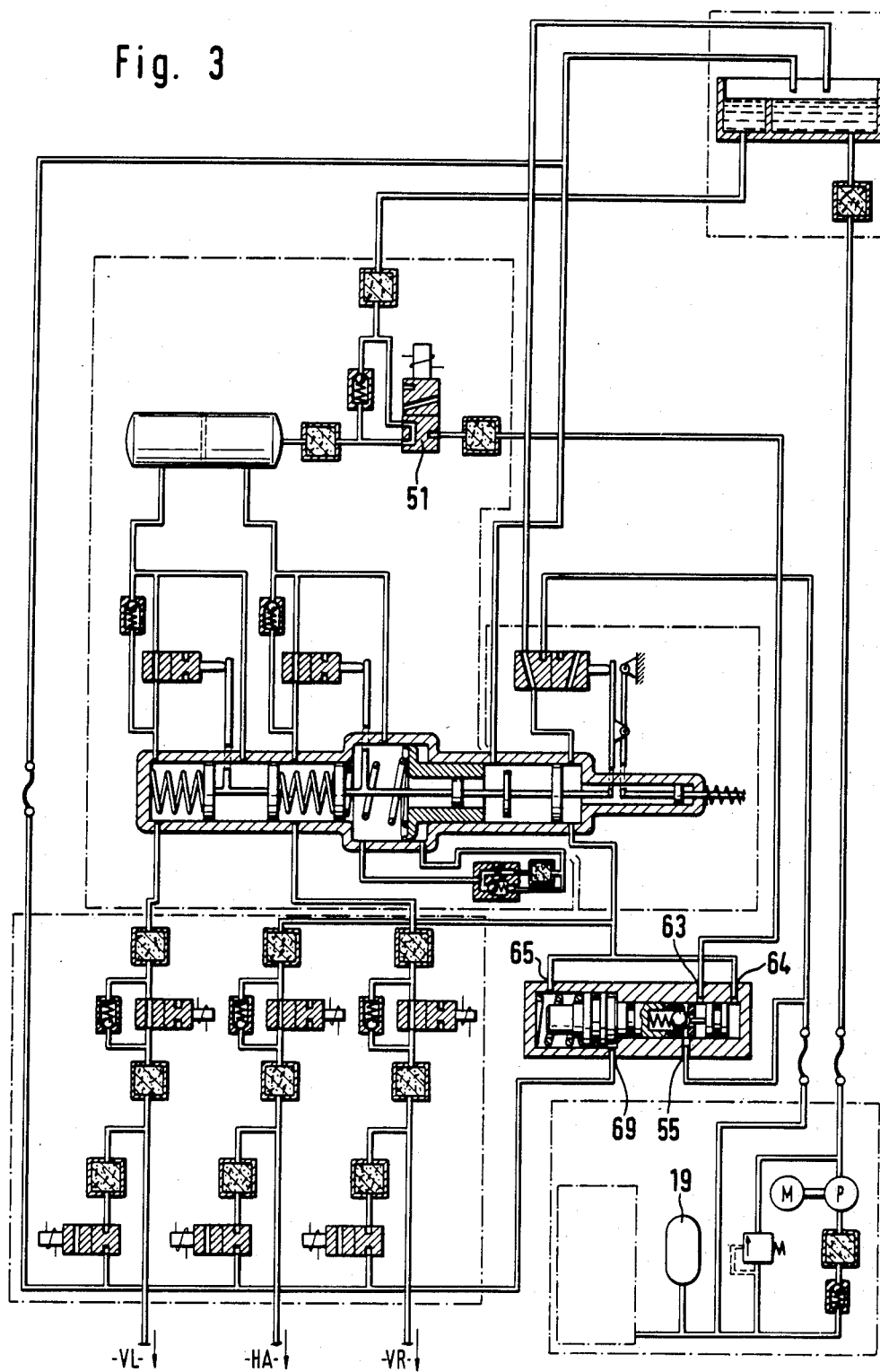
FIG. 3 shows an embodiment of the invention in a circuit derived from the circuit according to FIG. 2.
Figure 4:
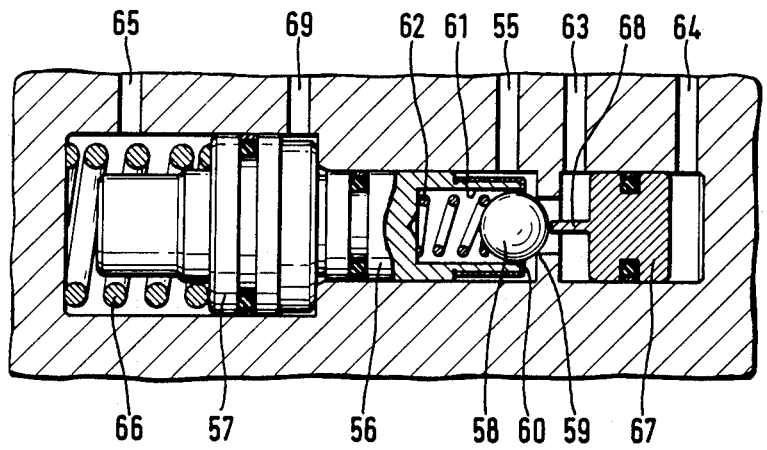
FIGS. 4-9 show a plurality of embodiments illustrating the invention.

FIGS. 4 to 8 illustrate different embodiments of valve arrangements according to the present invention. In the circuit depicted in FIG. 3, the valve means, as shown in detail in FIG. 4, is the integral unit performing the function of the TSC-aggregate, for instance switching off the TSC-mode during application of the brake, and regulating the accumulator pressure to the level of the booster pressure when applying the brake. For the sake of a better illustration, FIG. 3 only contains the reference numerals required for explaining the embodiment. The rest of the reference characters are conveyed by FIGS. 1 and 2.

The embodiment according to FIG. 4 constitutes a hydraulic switch valve which, normally, is in the TSC-position. When the brake is applied, it automatically switches in the ALC-mode. FIG. 4 is a sectional view. In the normal case, i.e., in the TSC-mode, the accumulator pressure prevails at the inlet 55. The accumulator pressure displaces the piston composed of piston portions 56, 57, against the force of the spring 66 to the left, with the ball 58 being removed from the valve seat. The ball 58 is held by a sheet metal element 60 in the guide 61. The ball is slidably guided therein and is under the load of the spring 62. The outlet to the non-pressurized reservoir is designated by reference numeral 69. After the ball 58 has been removed from the valve seat 59, pressure fluid can flow to the outlet 63. In this position, the TSC-mode is carried out.

Once the brake pedal is actuated, controlled brake force booster pressure is applied to the inlets 64, 65. The piston 56, 57, through the controlled booster pressure and through spring 66, is displaced to the right. The ball 58 is seated on the valve seat 59. Hence, the ball valve 58 first closes. The controlled brake force booster pressure prevailing at the inlet 64 is applied to the piston 67. The piston 67 moves to the left. The ball valve is now used as a control valve. The ball valve is opened by means of plunger 68 against the accumulator pressure prevailing at 55 and within the ball guide 61. The pressure fluid flowing from the accumulator 19 to the master valve 51 (see FIG. 3) applies an increasing pressure to the piston 67 until an equilibrium is reached, i.e., until a pressure level prevails to the left and to the right of the piston 67 that corresponds to the controlled booster pressure. The valve and the ball 58, respectively, perform a control function for the operating pressure in the ALC-mode. The pressure fluid which in FIG. 3 flows to the master valve 51, hence, no longer is derived from the pressure chamber of the brake force booster as shown, for example, in FIG. 1 and as described in the aforegoing but rather, from the outlet 63 of the valve according to the invention as shown in FIG. 4.

Accordingly, an advantage of the present invention makes it possible to use one valve seat. The previously described system requires, as shown, for example, in FIG. 2, two electromagnetic valves 39 and 40. The embodiment according to FIG. 4 is a switch valve turning off the TSC-mode in the applied position. In the applied position, the arrangement shown in FIG. 4, performs a control function, i.e., the accumulator pressure, in the applied position, is decreased to the booster pressure. The controlled accumulator pressure, in the ALC-mode is supplied to the master valve.

Figure 5:
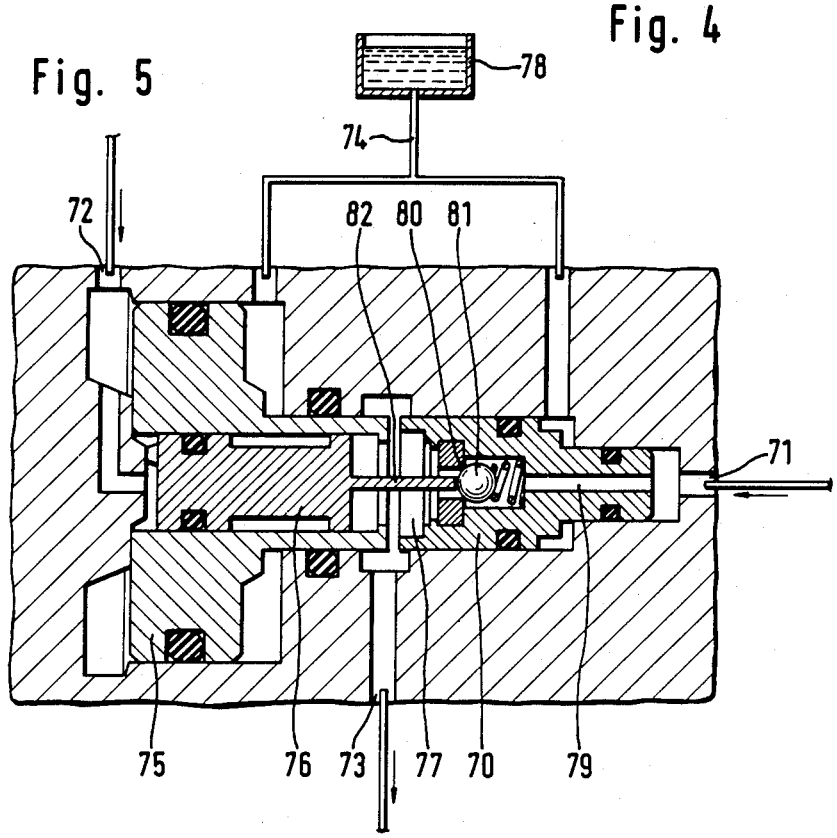
Figure 8:
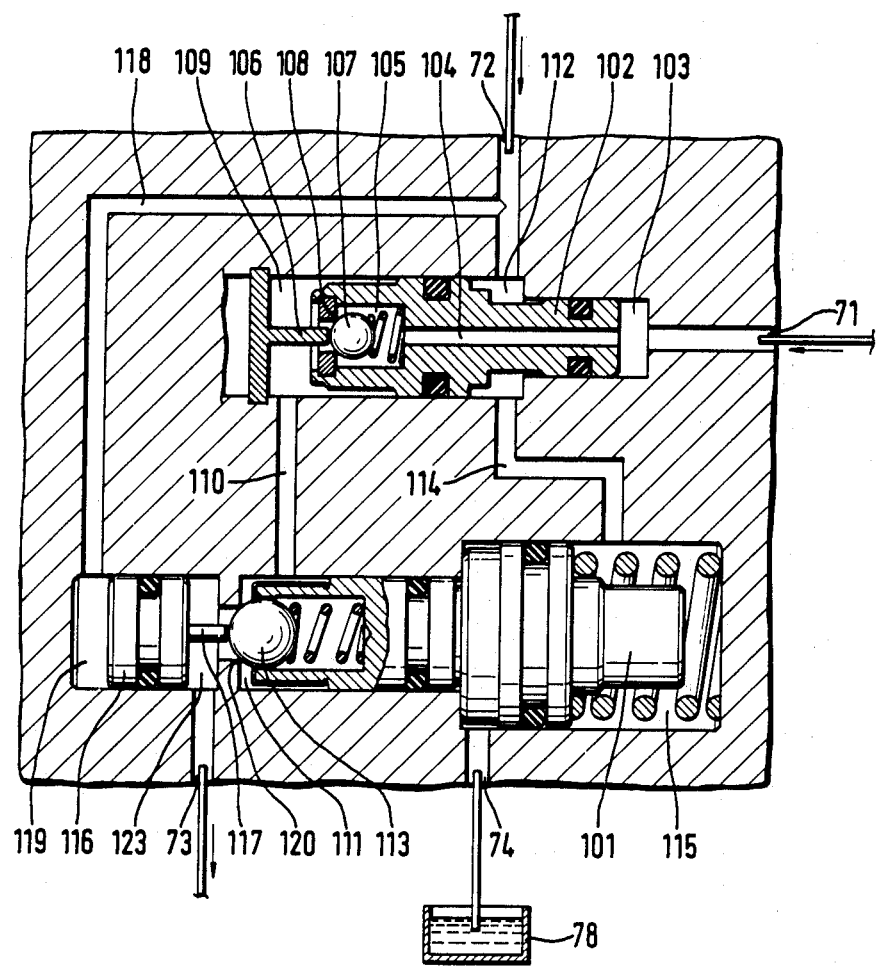

As compared therewith, FIGS. 5 and 8 show valve arrangements performing the function of a switch-off valve for terminating the TSC-mode; during the TSC-mode, the function of a control valve reducing the accumulator pressure to the pressure level of the TSC-level; during the ALC-mode, the function of reducing the accumulator pressure to the level of the booster pressure and making available the booster pressure for the ALC-mode directly, respectively.

In the embodiments according to FIGS. 5, 6, 7 and 8, the inlets and outlets are designated as follows:

Inlet 71 for the accumulator pressure;
Inlet 72 for controlled booster pressure;
Outlet 73 to the master valve;
Outlet 74 to the non-pressurized reservoir. The corresponding inlets and outlets of the TSC-aggregate 52 of FIG. 2, for the better understanding, are provided with identical reference characters 71, 72, 73, 74.

FIG. 5 shows a hydraulic valve performing the aforedescribed functions of the TSC-aggregate. Piston 70 is the control piston. Piston 75 is to be deemed a lock for switching off the control piston. Piston 76 supplies the controlled pressure to the master valve 51. In all of the illustrated embodiments, in the normal case, i.e., in the TSC-mode, half the accumulator pressure for the TSC-operation prevails at the connection 73 leading to the master valve 51.

Once the brake pedal is actuated, the controlled brake force booster pressure is applied to the pistons 75, 76. The piston 75 is displaced to the right to block the function of the regulator piston 70. Pressure fluid of the accumulator pressure level flows into the inlet 71 through the channel 79 and the valve seat 80 into the chamber 77. As the accumulator pressure is above the controlled pressure of the brake force booster, the piston 76 is displaced to the left. This will enable the ball 81 which, previously, has been removed from its seat through the plunger 82, to be replaced. Hence, a regulation operation takes place. The pressure in the chamber 77 and, hence, on the outlet 73, decreases to such an extent that a controlled booster pressure prevails on the outlet 73, for, at that time, the piston 76 is in equilibrium. Its effective faces to the left and to the right are of equal size.

Upon termination of the brake application, inlet 72 becomes non-pressurized. Pistons 75 and 76 displace to the left under the action of the pressure in the chamber 77. The regulator piston 70 is released to restart its operation. Based on the larger-sized cross-section of the piston 70 on the left-hand side as compared with the cross-section on the right-hand side, pressure in chamber 77 is adjusted to a level through ball 81 and valve seat 80, to a level which is lower than the accumulator pressure. In the present instance, the pressure on the outlet 73 amounts to half the accumulator pressure prevailing at the inlet 71. Half this accumulator pressure corresponds to the operating pressure adapted to the TSC-mode.

In summary the valve according to FIG. 5, in the TSC-mode, provides a pressure for TSC-operation, which is regulated by the regulator piston 70 and amounts, for example, to half the accumulator pressure. In the ALC-mode, through the piston 75, the regulator piston 70 is switched off so that the same pressure prevails at the outlet 73 of the master valve as it does at the inlet 72 at which controlled brake force booster pressure prevails. Reverting to the system as shown in FIG. 2, the valve according to FIG. 5 performs the functions of the electromagnetic valves 39 and 41 according to FIG. 2 and the function of the control valve 44.

Figure 6:
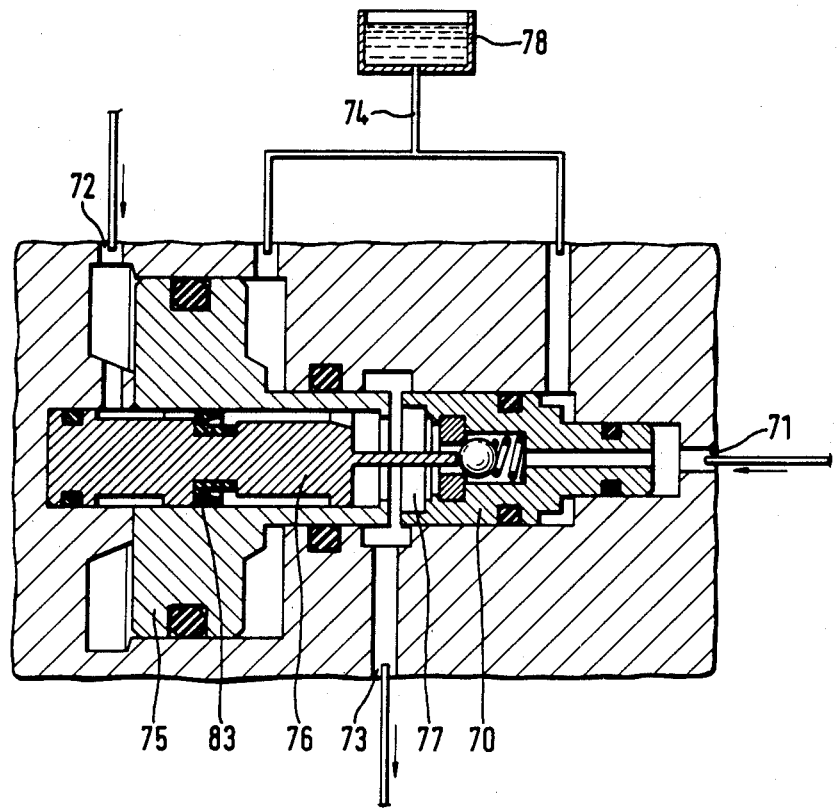

The embodiment according to FIG. 6 except for one feature, substantially corresponds to the embodiment according to FIG. 5. The controlled brake force booster pressure on the inlet 72, through a sealing sleeve 83 serving as a check valve, in the ALC-mode, is directly fed to the connection 73 for the master valve. The pressure level on the outlet 73 corresponds to the pressure level on the inlet 72.

Figure 7:
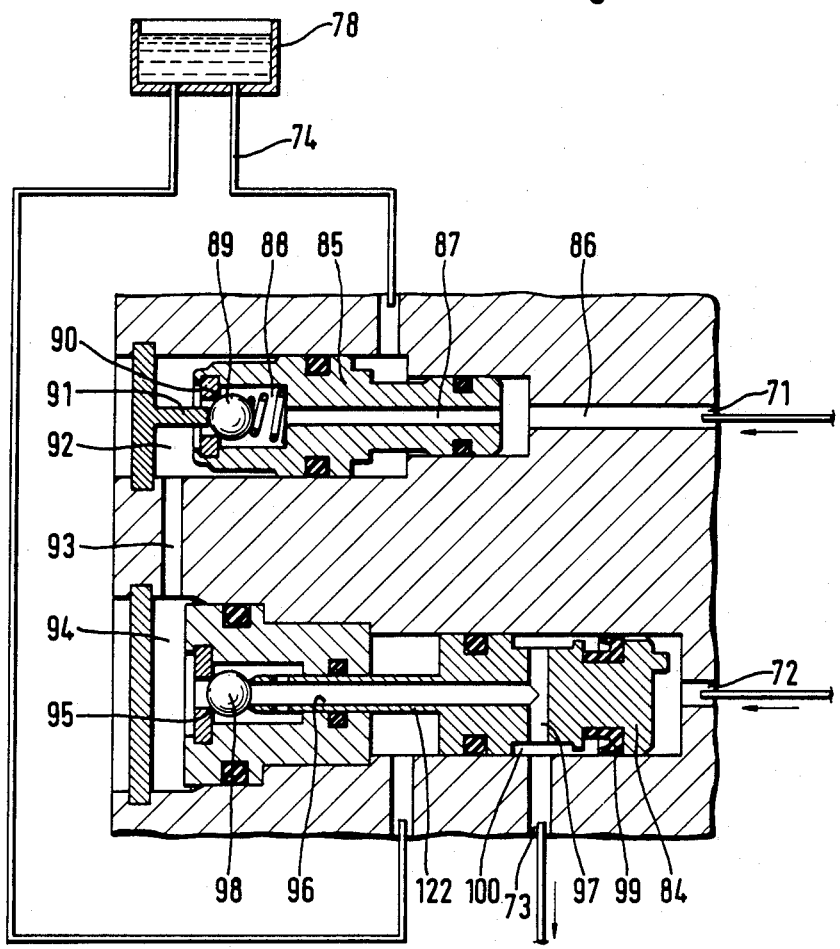

FIG. 7 shows the combination composed of a regulator and a switch valve. The regulator function is performed through the components accommodated in the upper portion of the aggregate of FIG. 7, whereas the switching function is performed through the components accommodated in the bottom part of the aggregate of FIG. 7. The portion which, in FIG. 7, is the upper one, hence, is the regulator portion includes a regulator piston 85. The portion demonstrated in the lower portion of FIG. 7 is the switching valve portion and includes a switching valve piston 84. In the TSC-mode, pressure fluid flows from the inlet 71 of accumulator pressure level into the regulator valve. Through the channel 86 in the housing and through the channel 87 in the regulator piston, pressure fluid is passed into the chamber 88. The accumulator pressure first acts on the effective right-hand face of the regulator piston. Between the ball 89 and the valve seat 90, a control process will take place. For, upon displacement of the regulator piston to the left, through the plunger 91, the ball is removed from its valve seat. In the TSC-mode, decreased accumulator pressure will, therefore prevail in the chamber 92. The pressure is passed on, through the channel 93, into the chamber 94. In the TSC-mode, pressure fluid of the decreased accumulator pressure flows through the valve seat 95, the channel 96 and the channel 97 to the outlet 73. Decreased accumulator pressure is, hence, supplied to the master valve.

With the brake applied, controlled booster pressure prevails on the inlet 72. It acts on the effective right-hand cross-section of the switch valve piston 84. The switch valve piston moves to the left, thereby forcing the ball 98 through the switch piston plunger 122 onto the valve seat 95. Further in-flow of pressure fluid of decreased pressure from the accumulator is precluded. The sealing sleeve 99 of the switch valve piston has the function of a check valve. Pressure fluid at the pressure level of the controlled booster pressure is passed into the annular chamber 100 and into the channel 97. Controlled booster pressure thus prevails in the ALC-mode.

The embodiment according to FIG. 8 corresponds to the embodiment according to FIG. 4 except that it is supplemented by regulator. The arrangement according to FIG. 8, bottom part thereof, shows the switch valve with a switch piston 101. Located above the switch valve is a control valve including the regulator piston 102. In the TSC-mode, pressure fluid of accumulator pressure level flows in through inlet 71. The pressure fluid is passed into the chamber 103 and into the central channel port 104 of the regulator piston 102 from where it flows into the chamber 105. Under the effect of the accumulator pressure, the regulator piston moves to the left. This movement is continued until the ball 107, through plunger 106, is removed from the valve seat 108. The afore-described control process is performed in the area of the ball and of the valve seat. In the chamber 109, a decreased accumulator pressure level prevails. The pressure fluid is then guided through the conduit 110 into the chamber 111. Through the controlled accumulator pressure in the chamber 111, the switch piston 101 is moved to the right. The ball 113 which—as shown in FIG. 4—is mechanically connected to the switch piston 101, is removed from the valve seat 120. Accordingly, in the chamber 123 and on the outlet 73, controlled accumulator pressure is available for the master valve, namely in the TSC-mode.

With the brake applied, the regulator piston 102 is out of balance, i.e., the pressure equilibrium of the regulator piston no longer exists. Due to the booster pressure prevailing in the chamber 112, the regulator piston is moved to its left-hand end position. In that position, the seat valve 107, 108 of the regulator piston fully opens such that uncontrolled accumulator pressure can be passed from the inlet 71, through the channel 104 and the conduit 110, into the chamber 111, thereby exerting a force component directed to the right on the switch piston 101. Through the conduit 114, booster pressure is passed into the chamber 115. The booster pressure generates on the piston 101 a force component directed to the left. The ball 113 provided in the aggregate at the bottom thereof, through piston 116 and plunger 117, under the action of the booster pressure prevailing at 72 and propagating through the conduit 118 into the chamber 119, is opened. A control process takes place in the area of the ball 113 and the appertaining valve seat 120. At 73, in this manner, a controlled accumulator pressure of a pressure level corresponding to the pressure level of the booster, is made available to the master valve in the ALC-mode. The piston 116 can also be replaced by a check valve or by a piston provided with a sealing sleeve capable of performing a check valve function.

Figure 9:
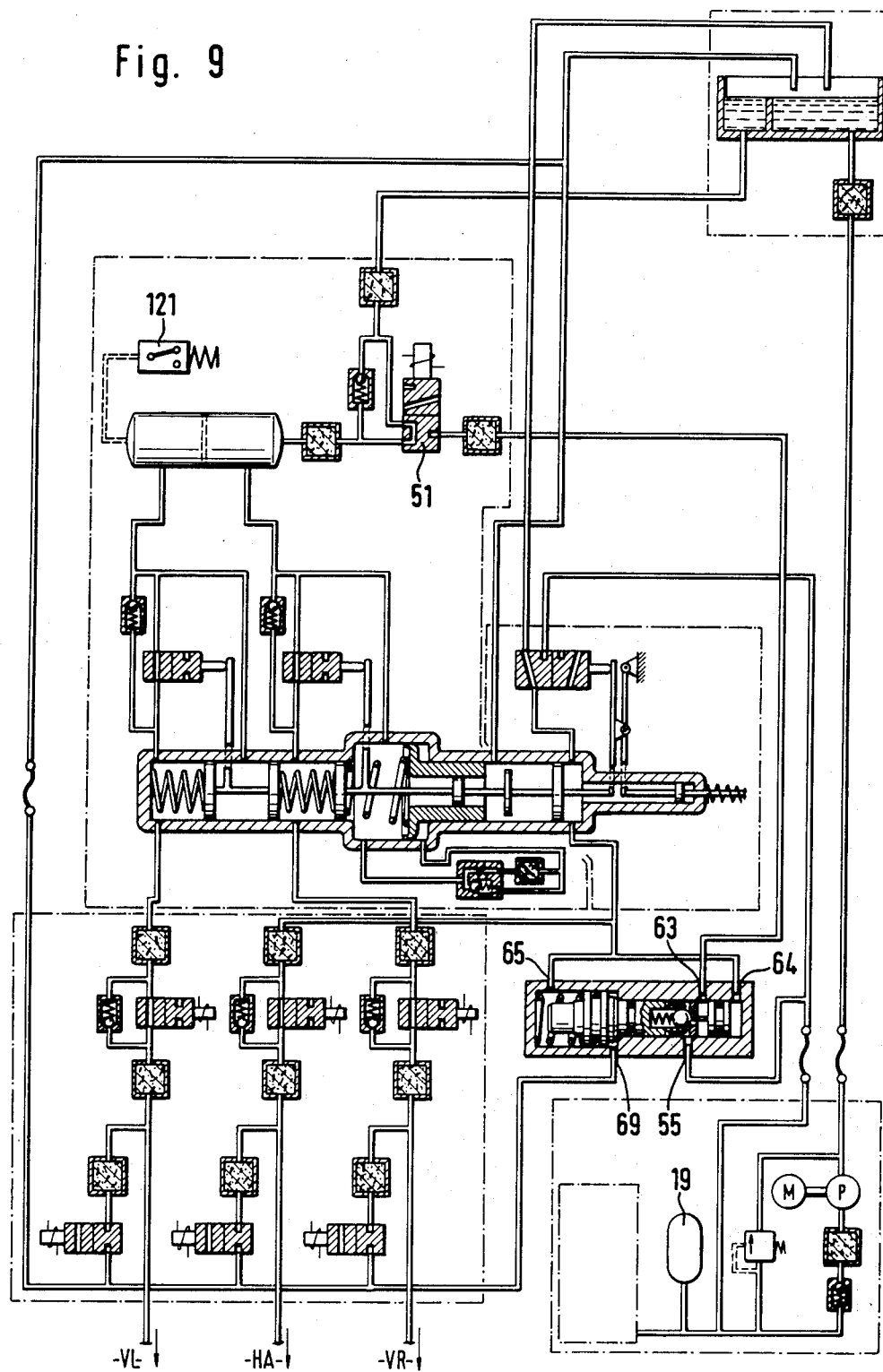

With a defective condition in the area of the master valve, inadvertently, pressure could be supplied to the front axle; see in this respect the diagram of FIGS. 2 and 3. In that case, an inadvertent full deceleration on an axle would occur. According to FIG. 9 it is suggested to provide a pressure switch 121 as an additional safety member behind the master valve. When the pressure switch supplies a signal to the electronic regulator that the master valve has not been actuated, the electronic regulator insures that all SG-valves associated with the wheel cylinders are opened. The accumulator is emptied thereby safely precluding an inadvertent deceleration of the automotive vehicle. An error message is displayed to the driver.

What is claimed is:

1. A brake pressure regulator for a hydraulic brake system for use with automotive vehicles for carrying out anti-locking control and traction skid control the system having a master cylinder, wheel cylinder pressure modulator means for changing hydraulic pressure in wheel cylinders, wheel sensor means for generating sensor signals, electronic regulator means for receiving the generated sensor signals, for processing the received sensor signals in accordance with at least one control algorithm, and for sending corrective variables to the wheel cylinder pressure modulator means, pressure fluid supply means for generating a hydraulic source pressure, a pressure fluid reservoir, and hydraulic brake force booster means actuable by a brake pedal for generating a controlled hydraulic booster pressure, the improvement comprising:

valve means, disposed between said pressure fluid supply means, said wheel cylinder pressure modulator means, and said hydraulic brake force booster means for controlling traction skid, said valve means including a first member openable under hydraulic source pressure to control traction skid by establishing a hydraulic connection between said pressure fluid supply means and said wheel cylinder pressure modulator means, and further including a second member movable upon termination of traction skid control and upon commencement of brake application under booster pressure, said second member establishing a hydraulic connection between said pressure fluid supply means and said wheel cylinder pressure modulator means while controlling said hydraulic source pressure adjusted to said control hydraulic booster pressure, wherein said first and second members include at least one plunger and ball combination such that the ball acts as a valve closing member and is displaceable from a valve seat by the plunger.

2. The brake pressure regulator according to claim 1, wherein the first and second members comprise a single plunger and ball combination.

3. The brake pressure regulator according to claim 1, wherein the plunger and ball combination is formed as a control valve.

4. The brake pressure regulator according to claim 1, wherein the plunger and ball combination comprises valve means for regulating the hydraulic source pressure to a traction skid control operating pressure.

5. The brake pressure regulator according to claim 1, wherein the plunger and ball combination comprises valve means for regulating the hydraulic source pressure in response to the booster pressure, to an anti-locking control operating pressure.

6. The brake pressure regulator according to claim 1, further comprising spring means for biasing the first member in a valve closing direction.

7. The brake pressure regulator according to claim 1, wherein the second member comprises a piston of equal effective cross-section on either side, with booster pressure being applied to a first cross-section and controlled pressure from said pressure fluid supply means regulated to a level of the booster pressure being applied to a second cross-section such that the piston is force-balanced.

8. The brake pressure regulator according to claim 7, wherein the first member comprises a closing member formed as a ball engagable with a seat and removably displaceable from the seat by a plunger connected to the second member formed as a piston.

9. The brake pressure regulator according to claim 1, wherein the valve means includes a hydraulic regulator for regulating a pressure level of fluid from said pressure fluid supply means to a traction skid control operating pressure level, the hydraulic regulator comprising a regulator piston including a closure member and a valve seat, a plunger capable of removing the closure member from the valve seat, the valve seat in communication with the regulator piston, the regulator piston slidingly and sealingly guided in a cylinder, the regulator piston formed as a differential piston, a smaller-sized effective cross-section of the regulator piston subjected to hydraulic source pressure, a larger-sized effective cross-section subjected to controlled hydraulic source pressure, the smaller-sized and the larger-sized effective cross-sections dimensioned at a ratio with respect to one another such that the hydraulic source pressure is regulated to a desired traction skid control operating pressure.

10. The brake pressure regulator according to claim 9, further comprising a blocking piston operable upon termination of traction skid control to lock the regulator piston under booster pressure.

11. The brake pressure regulator according to claim 10, further comprising a control piston having booster pressure applied to regulate the hydraulic source pressure to a desired level of anti-locking control operating pressure when in an applied position.

12. The brake pressure regulator according to claim 11, wherein the control piston includes a plunger, a valve closing member, and a valve seat for regulating said hydraulic source pressure to a desired level of anti-locking control operating pressure.

13. The brake pressure regulator according to claim 11, wherein the blocking piston and the control piston are disposed in co-axial relationship with respect to one another, and the blocking piston, in an interior thereof, comprises a cylindrical guide for the control piston.

14. The brake pressure regulator according to claim 11, wherein the control piston is sealed against the blocking piston by a sealing sleeve performing a check valve function, with a pressure fluid passage from a booster pressure inlet to an outlet for said wheel cylinder modulator means while preventing pressure fluid passage in an opposite direction.

15. The brake pressure regulator according to claim 1, wherein the valve means further comprises a regulator portion and a switch portion, the regulator portion including a regulator piston having a central axial bore furnished with a valve seat capable of being opened by a plunger, the regulator piston formed as a differential piston having hydraulic source pressure applied to a first smaller-sized effective cross-section of the dirfferential piston and controlled hydraulic pressure applied to a second larger-sized effective cross-section of the differential piston, a connecting line communicating between the regulator portion and the switch portion, a valve in the connecting line openable for controlling traction skid and closeable with the brake applied, the switch portion including a switch piston having a switch piston plunger with internal channels establishing a connection between the regulator portion and an outlet to said wheel cylinder modulator means for controlling traction skid, the switch piston having booster pressure applied thereto to close the valve with the switch piston plunger, the switch piston sealingly guided in a cylindrical guide with a sealing sleeve performing a check valve function enabling pressure fluid of booster pressure level to flow past the sealing sleeve and to feed to the outlet for said wheel cylinder modulator means.

16. The brake pressure regulator according to claim 1, wherein the valve means further comprises a regulator portion and a switch portion, the regulator portion including a regulator piston having a central axial port with a seat valve capable of being opened by a plunger, the regulator piston formed as a differential piston having hydraulic source pressure applied to a first smaller-sized effective cross-section of the differential piston and having controlled hydraulic pressure applied to a second larger-sized effective cross-section of the differential piston, a connection for booster pressure communicating with one annular pressure chamber in the regulator portion and with two pressure chambers in the switch portion, a connecting line communicating between the regulator portion and the switch portion carrying controlled hydraulic pressure with the connecting line being closeable through a valve disposed in the switch portion, the regulator piston having a third effective cross-section with booster pressure applied upon actuation of the brake to cause the regulator piston to move and to open along with the plunger, the valve allowing full hydraulic source pressure to be admitted to the connecting conduit, the switch portion having a switch piston with booster pressure applied in the first pressure chamber upon actuation of the brake to close the valve, the switch portion having a floating piston of two effective cross-sections of equal size with booster pressure applied in a second pressure chamber of the switch portion upon actuation of the brake, and controlled hydraulic pressure applied in a third pressure chamber, the floating piston having a plunger and cooperating with the valve in a pressure-controlling manner to provide at an output a controlled hydraulic pressure corresponding to the booster pressure.

17. The brake pressure regulator according to claim 16, further comprising a member disposed in the area of the floating piston performing a check valve function.

18. A process of monitoring the operation of a brake pressure regulator for an automotive vehicle having vehicle wheel cylinders and a pressure fluid supply means for generating hydraulic pressure, comprising an electromagnetically switchable hydraulic master valve disposed in a pressure fluid guide between traction slip control valve means and the wheel cylinder pressure modulator means, the wheel cylinder pressure modulator means having an electromagnetically operable valve for each wheel cylinder, said process comprising the steps of: sensing pressure in an area located between the master valve and wheel cylinder with a pressure-sensitive switch, generating a signal supplied to an electronic controller means from the pressure-sensitive switch, detecting whether the master valve has been actuated in the presence of the pressure switch signal with the electronic controller means, and if the master valve was not actuated, generating corrective signals for switching the valves associated with the wheel cylinders to open the valves and de-pressurize the pressure fluid supply means.

* * * * *